United States Patent
Kim et al.

(10) Patent No.: US 9,744,839 B2
(45) Date of Patent: Aug. 29, 2017

(54) TRANSMISSION FOR HYBRID VEHICLE

(71) Applicant: HYUNDAI MOTOR COMPANY, Seoul (KR)

(72) Inventors: Baek Yu Kim, Suwon-si (KR); Seok Joon Kim, Yongin-si (KR); Jun Young Ha, Ulsan (KR); Chul Min Ahn, Busan (KR); Sung Gon Byun, Anyang-si (KR)

(73) Assignee: HYUNDIA MOTOR COMPANY, Seoul (KR)

( * ) Notice: Subject to any disclaimer, the term of this patent is extended or adjusted under 35 U.S.C. 154(b) by 127 days.

(21) Appl. No.: 14/662,081

(22) Filed: Mar. 18, 2015

(65) Prior Publication Data

US 2016/0152130 A1    Jun. 2, 2016

(30) Foreign Application Priority Data

Nov. 28, 2014    (KR) .......................... 10-2014-0168604

(51) Int. Cl.
| | |
|---|---|
| *F16H 3/72* | (2006.01) |
| *F16H 37/06* | (2006.01) |
| *B60K 6/365* | (2007.10) |
| *B60K 6/36* | (2007.10) |
| *B60K 6/383* | (2007.10) |
| *B60K 6/387* | (2007.10) |

(Continued)

(52) U.S. Cl.
CPC ................ *B60K 6/36* (2013.01); *B60K 6/383* (2013.01); *B60K 6/387* (2013.01); *B60K 6/445* (2013.01);

(Continued)

(58) Field of Classification Search
CPC ........................ F16H 2200/2005; B60K 6/365
See application file for complete search history.

(56) References Cited

U.S. PATENT DOCUMENTS

| 6,695,736 B2 | 2/2004 | Takenaka | |
|---|---|---|---|
| 7,189,177 B2 * | 3/2007 | Takasu | B60K 6/365 180/65.28 |

(Continued)

FOREIGN PATENT DOCUMENTS

| JP | 2004-284550 A | 10/2004 |
|---|---|---|
| JP | 3976026 B2 | 9/2007 |

(Continued)

OTHER PUBLICATIONS

Korean Office Action issued in corresponding Korean Patent Application No. 10-2014-0168604, mailed on Sep. 12, 2016.

(Continued)

*Primary Examiner* — Tisha Lewis
(74) *Attorney, Agent, or Firm* — McDermott Will & Emery LLP (57) ABSTRACT

A transmission for a hybrid vehicle includes a planetary gear set including at least three rotary members of which one is connected to an engine. A first anti-rotator selectively restricts rotation of the rotary member connected to the engine. A first motor generator is connected to another one of the rotary members of the planetary gear set. A second motor generator is connected to the remaining one of the rotary members of the planetary gear set. An output shaft has a first output gear thereon, which is externally engaged with the rotary member connected to the first motor generator. A second anti-rotator selectively restricts rotation of the rotary member connected to the second motor generator.

16 Claims, 8 Drawing Sheets

(51) Int. Cl.
*B60K 6/445* (2007.10)
*B60K 6/38* (2007.10)
*F16H 37/08* (2006.01)

(52) U.S. Cl.
CPC ........ *F16H 3/727* (2013.01); *B60K 2006/381* (2013.01); *B60Y 2200/92* (2013.01); *F16H 2037/0866* (2013.01); *Y02T 10/6239* (2013.01); *Y02T 10/76* (2013.01); *Y10S 903/91* (2013.01)

(56) References Cited

U.S. PATENT DOCUMENTS

| | | | |
|---|---|---|---|
| 8,430,190 B2 * | 4/2013 | Honda | B60K 6/36 180/65.21 |
| 2010/0139998 A1 | 6/2010 | Schondorf | |

FOREIGN PATENT DOCUMENTS

| | | | | |
|---|---|---|---|---|
| JP | 2010-076680 A | | 4/2010 | |
| JP | 2011208758 A | * | 10/2011 | ............. B60K 6/365 |
| JP | 2013-107525 A | | 6/2013 | |
| JP | 5318185 B2 | | 10/2013 | |
| KR | 10-2007-0084657 A | | 8/2007 | |
| KR | 2010-0095077 A | | 8/2010 | |
| KR | 10-1459472 B1 | | 11/2014 | |

OTHER PUBLICATIONS

Office Action issued on Mar. 4, 2016, in related Korean Patent Application No. 10-2014-0168604.

* cited by examiner

TRANSMISSION FOR HYBRID VEHICLE

CROSS REFERENCE TO RELATED APPLICATION

The present application claims the benefit of priority to Korean Patent Application Number 10-2014-0168604 filed on Nov. 28, 2014, the entire contents of which application are incorporated herein for all purposes by this reference.

TECHNICAL FIELD

The present disclosure generally relates to a transmission for a hybrid vehicle capable of improving fuel efficiency of a vehicle with a simple configuration.

BACKGROUND

A hybrid vehicle is driven by appropriately combining power from an internal combustion engine and power from a motor driven by electricity to improve fuel efficiency.

In the related art, a hybrid vehicle has been developed to improve the fuel efficiency by implementing the optimum driving mode for driving conditions in various ways, but additional power consumption for implementing the driving mode such as a hydraulic device has not been sufficiently considered.

That is, the hybrid vehicle in a city generally runs in a power split mode and generates electricity to charge a battery using power from the engine. However, in the related art, additional energy consumption for operating a hydraulic device or an actuator to achieve the driving mode has not been sufficiently considered, thus limiting improvement of fuel efficiency of the hybrid vehicle.

The foregoing is intended merely to aid in the understanding of the background of the present disclosure, and is not intended to mean that the present disclosure falls within the purview of the related art that is already known to those skilled in the art.

SUMMARY

The present disclosure has been made keeping in mind the above problems occurring in the related art, and the present disclosure is intended to propose a transmission for a hybrid vehicle that can considerably, substantially improve fuel efficiency of the hybrid vehicle by minimizing energy consumed for other available driving modes without additional power consumption for a power split mode which is frequently used in the hybrid vehicle, and which has a simple configuration, thereby improving the commercial value of a hybrid vehicle.

According to an embodiment of the present inventive concept, a transmission for a hybrid vehicle that includes a planetary gear set including at least three rotary members of which one is connected to an engine. A first anti-rotator selectively restricts rotation of the rotary member which is connected to the engine. A first motor generator is connected to another one of the rotary members of the planetary gear set. A second motor generator connected to the remaining one of the rotary members of the planetary gear set. An output shaft has a first output gear thereon, which is externally engaged with the rotary member connected to the first motor generator. A second anti-rotator selectively restricts rotation of the rotary member which is connected to the second motor generator.

According to another embodiment of the present inventive concept, a transmission for a hybrid vehicle includes an engine shaft receiving a power from an engine, a motor shaft receiving a power from two or more motor generators, and an output shaft and a differential shaft receiving the power from the engine shaft and the motor shaft. The engine shaft and the motor shaft are parallel spaced apart from each other, and the motor generators connected to the motor shaft are concentrically arranged using a hollow shaft.

According to the present disclosure, it is possible to considerably, substantially improve fuel efficiency of a hybrid vehicle by minimizing energy consumed for other available driving modes without additional power consumption for a power split mode frequently used in the hybrid vehicle, and that has a simple configuration, thereby improving the commercial value of a hybrid vehicle.

BRIEF DESCRIPTION OF THE DRAWINGS

The above and other objects, features and other advantages of the present disclosure will be more clearly understood from the following detailed description when taken in conjunction with the accompanying drawings.

DETAILED DESCRIPTION

Hereinbelow, exemplary embodiments of the present inventive concept will be described in detail with reference to the accompanying drawings.

Figure 1:
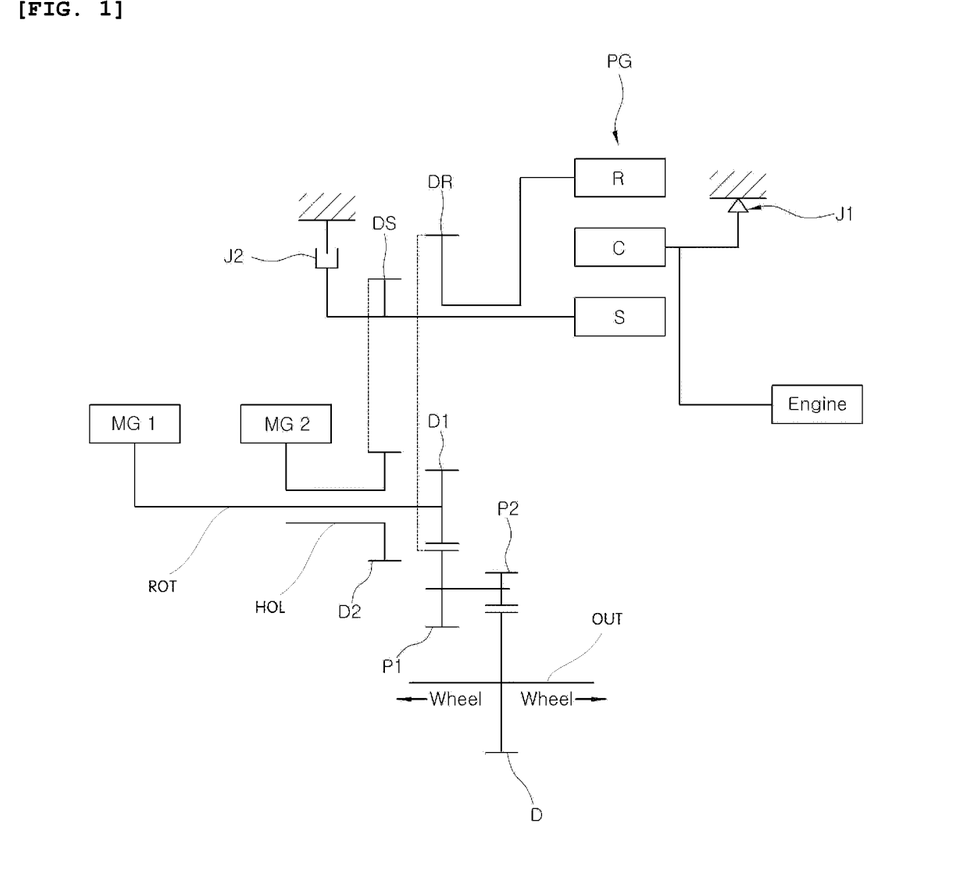
FIG. 1 is a diagram showing the configuration of a transmission for a hybrid vehicle according to an embodiment of the present inventive concept.

Referring to FIG. 1, a transmission according to an embodiment of the present inventive concept includes a planetary gear set PG including at least three rotary members of which one is connected to an engine. A first anti-rotator J1 selectively restricts rotation of the rotary member connected to the engine. A first motor generator MG1 is connected to another one of the rotary members of the planetary gear set PG. A second motor generator MG2 is connected to the remaining one of the rotary members of the planetary gear set PG. An output shaft OUT has a first output gear P1 thereon externally engaged with the rotary member connected to the first motor generator MG1. A second anti-rotator J2 selectively restricts rotation of the rotary member connected to the second motor generator MG2.

That is, in the transmission according to the embodiment of the present inventive concept, the rotary members of the planetary gear set PG are connected to the engine, the first motor generator MG1, and the second motor generator MG2, respectively. Power can be output to the output shaft OUT through the first output gear P1 from one of the rotary members of the planetary gear set PG, and the other two rotary members of the planetary gear set PG can be selectively rotated.

Therefore, in the embodiment of the present inventive concept, the first motor generator MG1 and the second motor generator MG2 can apply a torque coaxially to a rotary shaft through which the power from the engine is input.

In the embodiment of the present inventive concept, the first motor generator MG1 and the second motor generator MG2 are externally connected to the rotary members of the planetary gear set PG, respectively.

That is, a first motor gear D1 connected to the associated rotary member of the planetary gear set PG is integrally connected to the first motor generator MG1, and a second motor gear D2 connected to the associated rotary member of the planetary gear set PG is integrally connected to the second motor generator MG2.

The first motor gear D1 and the second motor gear D2 are concentrically arranged, and the second motor gear D2 is fitted on a hollow shaft HOL surrounding a rotary shaft ROT of the first motor gear D1 and connected to the second motor generator MG2.

The planetary gear set PG includes three rotary members, which are, a sun gear S, a ring gear R, and a carrier C. The engine is connected to the carrier C, a first driving gear DR engaged with the first output gear P1 on the output shaft OUT is connected to the ring gear R, and a second driving gear DS engaged with the second motor gear D2 connected to the second motor generator MG2 is connected to the sun gear S.

Figure 2:
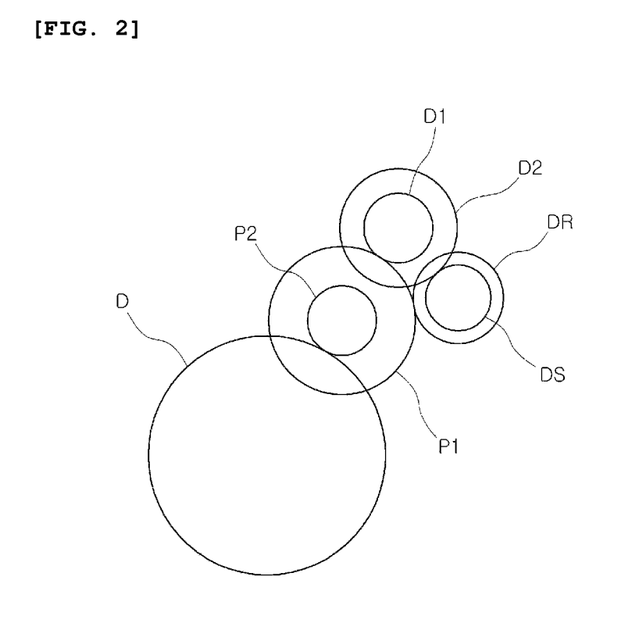
FIG. 2 is a side view showing arrangement of shafts shown in FIG. 1.
Figure 3:
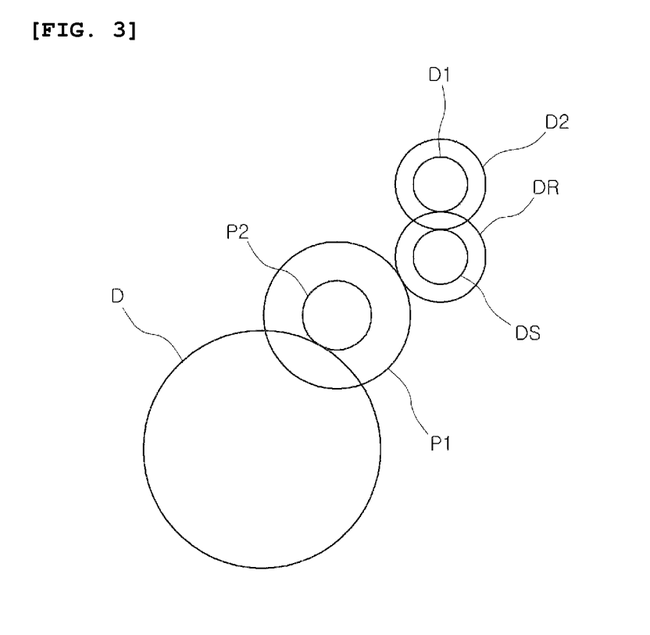
FIG. 3 is a diagram showing arrangement of shafts different from that of FIG. 2.

The present disclosure may be implemented in two different embodiments, as shown in FIGS. 2 and 3, in accordance with the position of the first motor gear D1.

That is, the first motor generator D1 is in mesh with the first output gear P1 in FIG. 2, and the first motor gear D1 is in mesh with the first driving gear DR in FIG. 3. In those configurations, whether to output the power from the first motor generator MG1 connected to the first motor gear D1 to the output shaft OUT directly through the first output gear P1 as in FIG. 2, or to transmit the power from the first motor generator MG1 to the first output gear P1 through the first driving gear DR connected to the ring gear R as in FIG. 3 may be different, but other operations are the same.

Accordingly, in the configurations shown in FIGS. 2 and 3, the arrangement of the shafts may be appropriately selected in consideration of packaging characteristics of the transmission.

Further, the first anti-rotator J1 may be a two-way clutch or a brake, but using a one-way clutch structurally preventing the engine from reversing may achieve a simple configuration.

The second anti-rotator J2 is a brake, but it may be any one as long as it can actively restrict rotation of the sun gear S regardless of whether or not it is a mechanical type such as a hydraulic brake or other levers.

The operation of the transmission having the configuration shown in FIG. 1 is described with reference to FIGS. 4 to 6.

Figure 4:
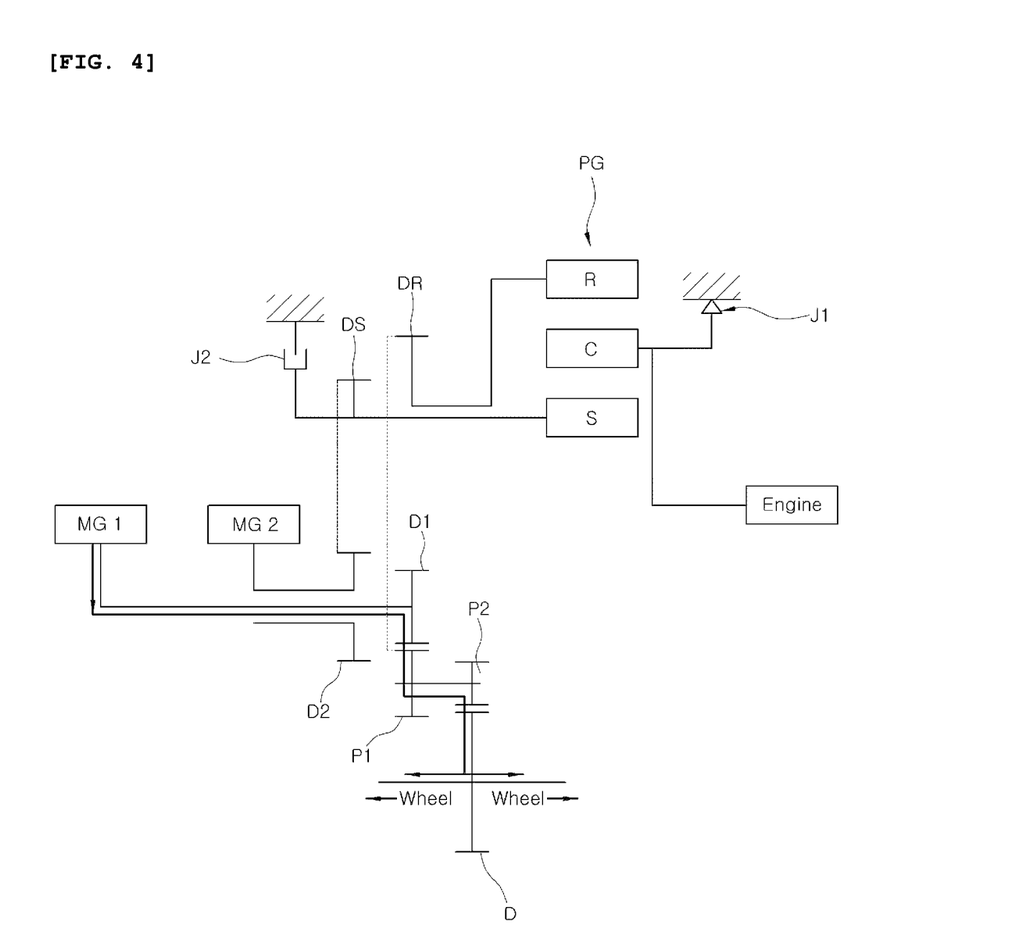
FIG. 4 is a diagram showing an electric vehicle (EV) mode in which the transmission shown in FIG. 1 is operated by only a motor generator.

FIG. 4 is a diagram showing an EV mode in which the transmission shown in FIG. 1 is operated by only a motor generator, in which the power from the first motor generator MG1 is transmitted to the output shaft OUT through the first motor gear D1 and the first output shaft P1. A second output gear P2 on the output shaft OUT is in mesh with a differential D, such that the power is output to driving wheels at both sides. Further, the engine stops, and the carrier C of the planetary gear set PG is prevented from reversing by the one-way clutch.

Figure 5:
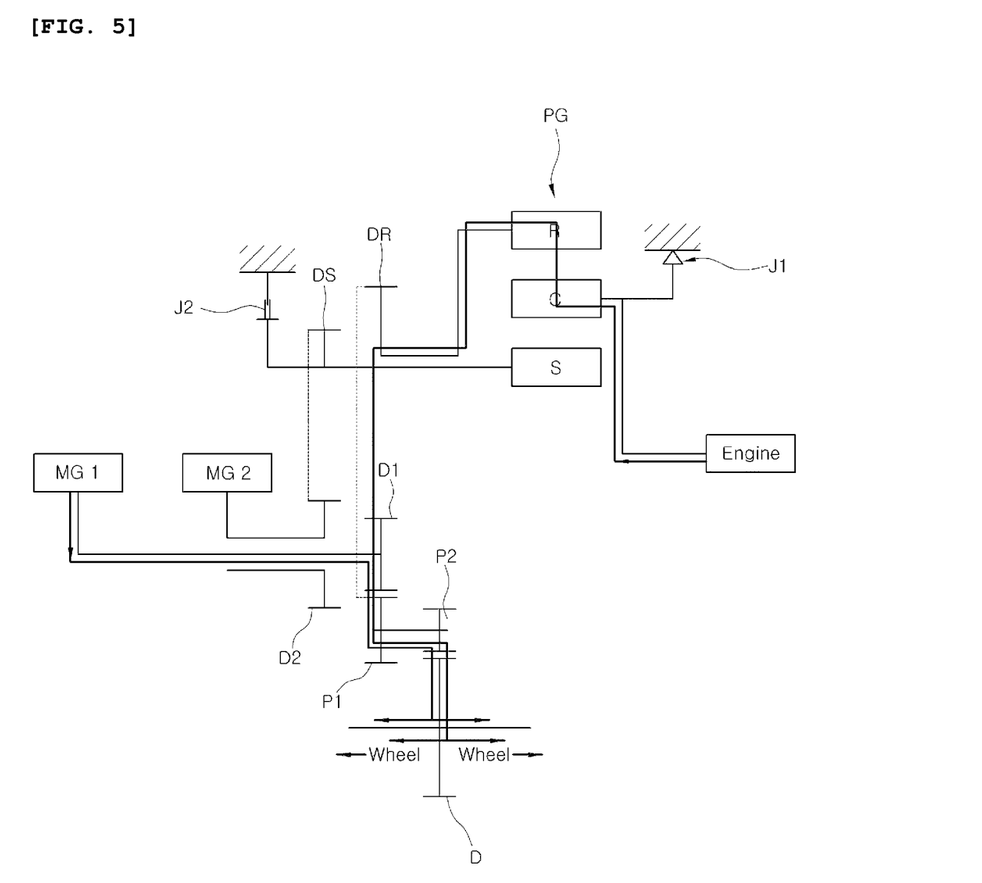
FIG. 5 is a diagram showing an overdrive mode and a hybrid vehicle implemented by the transmission shown in FIG. 1, using power from an engine.

FIG. 5 is a diagram showing an overdrive mode and a hybrid vehicle implemented by the transmission shown in FIG. 1, using power from an engine, in which the sun gear S is prevented from rotating by the second anti-rotator J2 and the power from the engine is increased through the planetary gear set PG and then output to the output shaft OUT through the first output gear P1 from the first driving gear DR connected to the ring gear R, thereby realizing the overdrive mode. Here, when the first motor generator MG1 generates power and operates the first output gear P1 with the first motor gear D1, the power from a motor and the engine is applied to the driving wheels, thereby realizing the hybrid mode.

Figure 6:
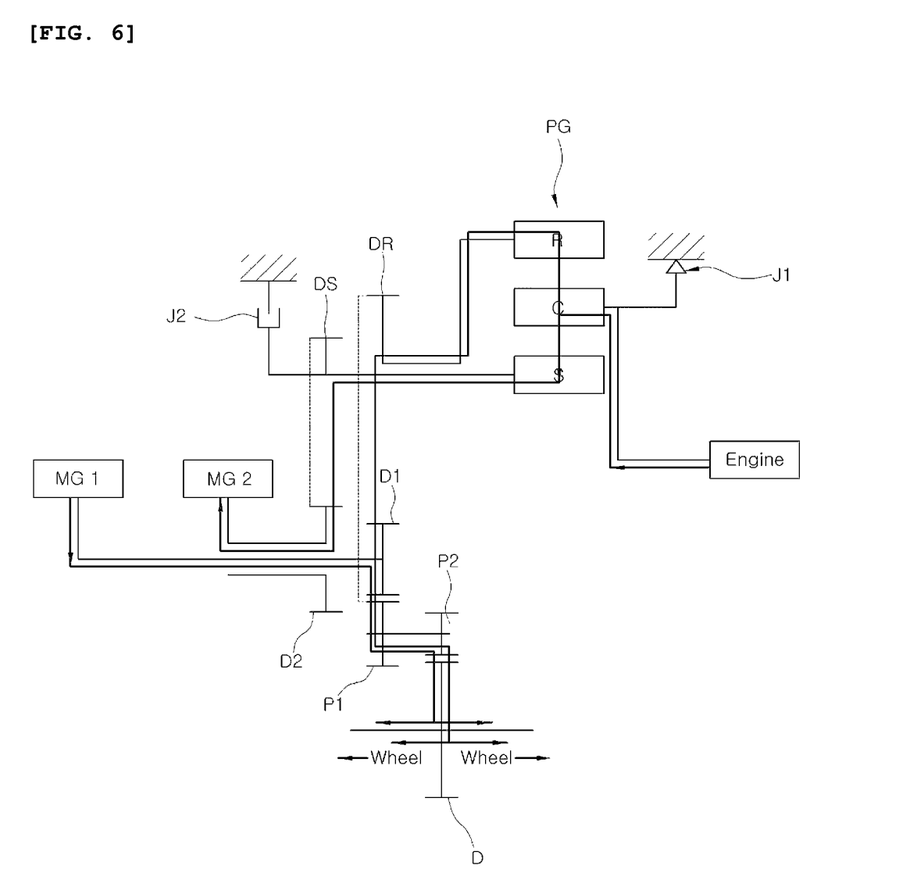
FIG. 6 is a diagram showing a power split mode implemented by the transmission of FIG. 1.

FIG. 6 shows a power split mode implemented by the transmission shown in FIG. 1, in which without the first anti-rotator J1 and the second anti-rotation member J2 operating, the power from the engine is transmitted to the carrier C and then split to the sun gear S and the ring gear R. The power split to the ring gear R is transmitted to the output shaft OUT through the first driving gear DR and the first output gear P1 and provided as a driving force for driving the driving wheels, while the power split to the sun gear S is supplied to the second motor generator MG2 through the second driving gear DS and the second motor gear D2 and used to generate electricity.

That is, the power slit mode of the hybrid vehicle frequently used in a city can be achieved without operating any additional components as shown in FIG. 6, thus minimizing addition power consumption and improving fuel efficiency of the hybrid vehicle.

Figure 7:
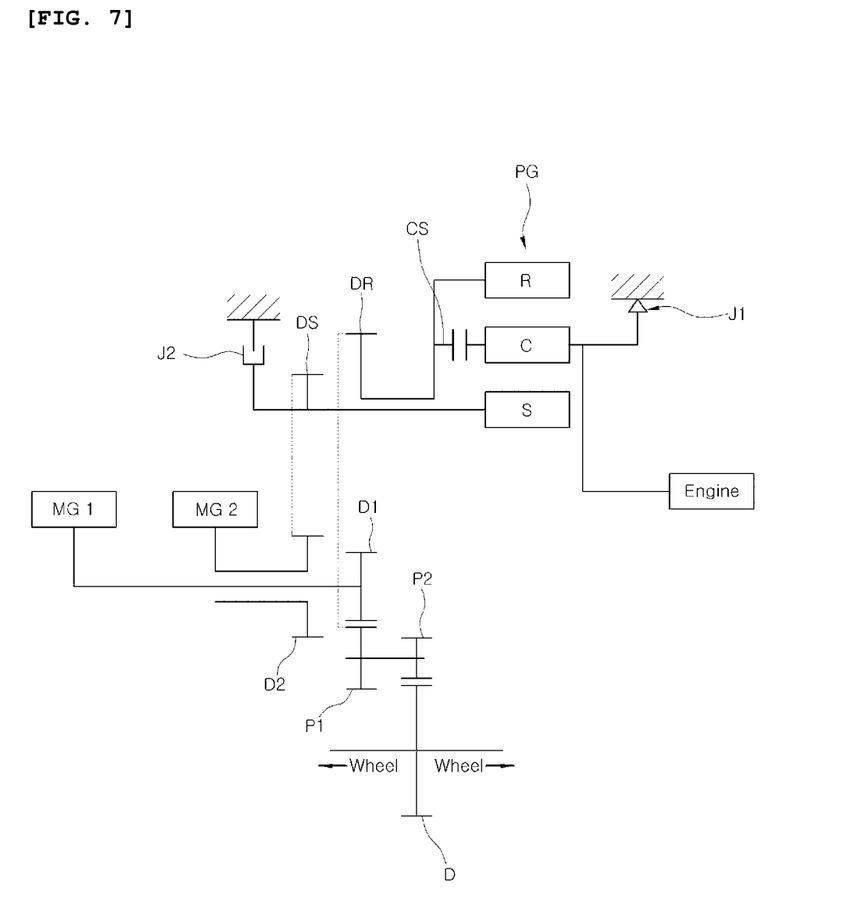
FIG. 7 is a diagram showing another embodiment of the present inventive concept.
Figure 8:
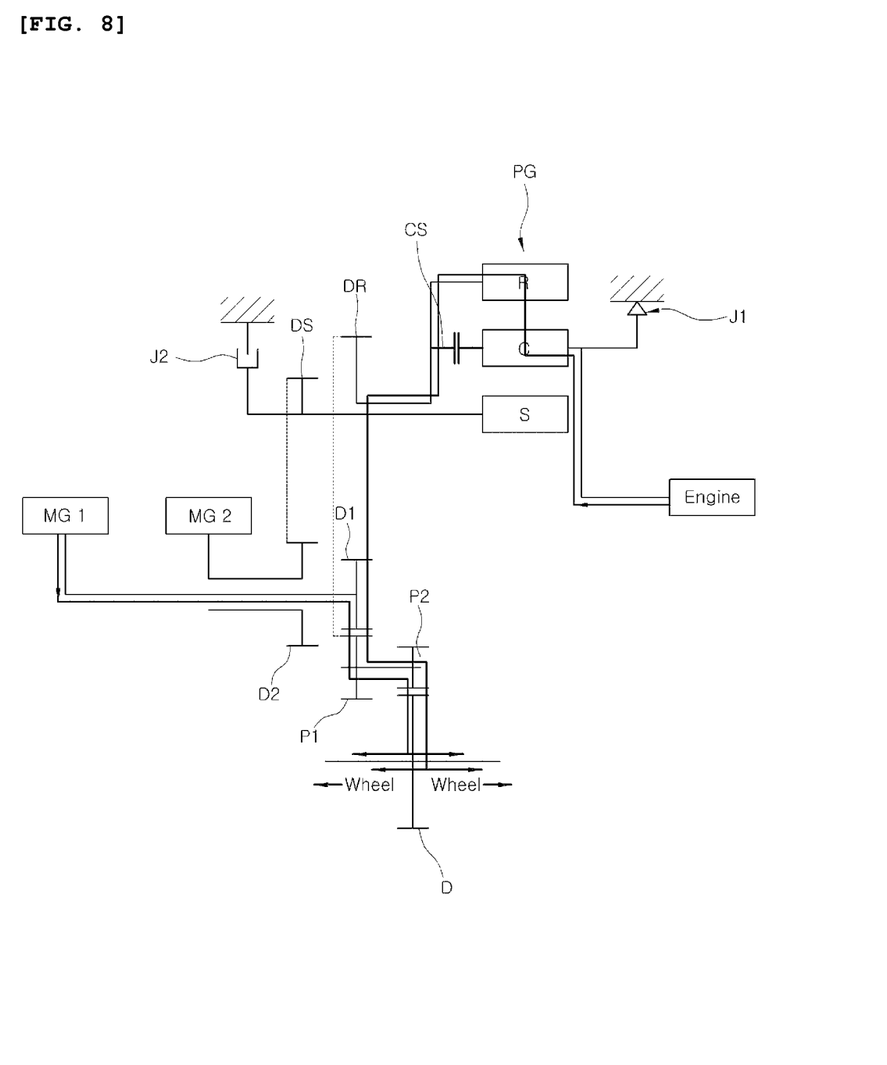
FIG. 8 is a diagram showing a one-to-one engine direct connection mode by the transmission shown in FIG. 7.

FIGS. 7 and 8 show another embodiment of the present inventive concept having the same configuration as that of the previous embodiment except that a clutch CS is further provided to engage or disengage two of the rotary members of the planetary gear set PG with or from each other. In FIGS. 7 and 8, the clutch CS is disposed between the ring gear R and the carrier C of the planetary gear set PG.

FIG. 8 is a diagram showing an operation of the transmission shown in FIG. 7, in which a power flows when the clutch CS is included in the configuration of FIG. 7. That is, since the ring gear R and the carrier C are connected to each other by the clutch CS, all the rotary members of the planetary gear set PG operate as a single unit, such that the power from the engine input to the carrier C is output at a gear ratio of 1:1, and thus, a one-to-one engine direction mode is achieved.

The transmission for a hybrid vehicle of the present disclosure which has the configuration described above may be explained as follows.

That is, the transmission for a hybrid vehicle according to the present disclosure includes an engine shaft receiving power from an engine, a motor shaft receiving power from two or more motor generators, and an output shaft and a differential shaft receiving the power from the engine shaft and the motor shaft. The engine shaft and the motor shaft are parallel spaced apart from each other, and the motor generators connected to the motor shaft are concentrically arranged using a hollow shaft.

Referring to FIGS. 2 and 3, the engine shaft corresponds to a center of the first driving gear DR and the second driving gear D2, the motor shaft corresponds to a center of the first motor gear D1 and the second motor gear D2, the output shaft corresponds to a center of the first output gear P1 and the second output gear P2, and the differential shaft corresponds to a center of the differential D.

The present disclosure includes a planetary gear set PG including three rotary members of which one is connected to an engine shaft and the other two rotary members are externally connected to motor generators connected to a motor shaft.

The motor generators are a first motor generator MG1 and a second motor generator MG2, in which the second motor generator MG2 usually operates as an electric generator.

The three rotary members of the planetary gear set PG are a sun gear S, a carrier C, and a ring gear R, in which the carrier C is connected to the engine shaft, the ring gear R is connected to the first motor generator MG1, and the sun gear S is connected to the second motor generator MG2. The transmission further includes a first anti-rotator J1 to restrict rotation of the carrier C, and the first anti-rotator J1 may be a one-way clutch or a two-way clutch and may be disposed between the engine and the carrier or between a motor and the carrier C.

The transmission may further include a second anti-rotator J2 to restrict rotation of the sun gear S, and the second anti-rotator J2 may be a hydraulic brake or an electronic brake and may be disposed on the engine shaft or the motor shaft.

Although exemplary embodiments of the present inventive concept has been described for illustrative purposes, those skilled in the art will appreciate that various modifications, additions and substitutions are possible, without departing from the scope and spirit of the disclosure as disclosed in the accompanying claims.

What is claimed is:

1. A transmission for a hybrid vehicle, comprising:
    a planetary gear set including at least three rotary members of which one is connected to an engine;
    a first anti-rotator selectively restricting rotation of the rotary member connected to the engine;
    a first motor generator connected to another one of the rotary members of the planetary gear set;
    a second motor generator connected to the remaining one of the rotary members of the planetary gear set;
    an output shaft having a first output gear thereon, the first output gear externally engaged with the rotary member connected to the first motor generator; and
    a second anti-rotator selectively restricting rotation of the rotary member connected to the second motor generator,
    wherein the first motor generator and the second motor generator are externally connected to the corresponding rotary members of the planetary gear set,
    wherein a first motor gear connected to the associated rotary member of the planetary gear set is integrally connected to the first motor generator,
    wherein a second motor gear connected to the associated rotary member of the planetary gear set is integrally connected to the second motor generator, and
    wherein the first motor gear and the second motor gear are concentrically arranged.

2. The transmission of claim 1, wherein the planetary gear set includes a sun gear, a ring gear, and a carrier, wherein
    the carrier is connected to the engine,
    the ring gear has a first driving gear being engaged with the first output gear of the output shaft, and
    the sun gear has a second driving gear being engaged with the second motor gear connected to the second motor generator.

3. The transmission of claim 2, wherein the second motor gear is fitted on a hollow shaft which surrounds a rotary shaft of the first motor gear and is connected to the second motor generator.

4. The transmission of claim 2, wherein the first motor gear is engaged with the first output gear.

5. The transmission of claim 2, wherein the first motor gear is engaged with the first driving gear.

6. The transmission of claim 1, wherein the first anti-rotator is a one-way clutch preventing the engine from reversing.

7. The transmission of claim 1, wherein the first anti-rotator and the second anti-rotator are brakes.

8. The transmission of claim 1, further comprising:
    a clutch for engaging or disengaging two of the rotary members of the planetary gear set with or from each other.

9. The transmission of claim 8, wherein the clutch is disposed between a ring gear and a carrier of the planetary gear set.

10. The transmission of claim 2, further comprising:
    a clutch for engaging or disengaging two of the rotary members of the planetary gear set with or from each other.

11. The transmission of claim 1, further comprising:
    a second output gear on the output shaft being engaged with the first output gear and in mesh with a differential.

12. A transmission for a hybrid vehicle, comprising an engine shaft receiving a power from an engine, a motor shaft receiving a power from at least two motor generators, and an output shaft and a differential shaft receiving the power from the engine shaft and the motor shaft, wherein
    the engine shaft and the motor shaft are spaced apart in parallel from each other,
    the motor generators connected to the motor shaft are concentrically arranged by using a hollow shaft,
    wherein the transmission further comprises a planetary gear set including three rotary members of which one is connected to the engine shaft and remaining two rotary members are externally connected to the motor generators, and
    wherein the motor generators are a first motor generator and a second motor generator, and
    wherein the three rotary members of the planetary gear set are a sun gear, a carrier, and a ring gear, and
    wherein the carrier is connected to the engine shaft, the ring gear is connected to the first motor generator, and the sun gear is connected to the second motor generator.

13. The transmission of claim 12, further comprising:
    a first anti-rotator for restricting rotation of the carrier, wherein
    the first anti-rotator is a one-way clutch.

14. The transmission of claim 12, further comprising;
    a first anti-rotator for restricting rotation of the carrier, wherein
    the first anti-rotator is a two-way clutch.

15. The transmission of claim 12, further comprising:
    a second anti-rotator for restricting rotation of the sun gear, wherein
    the second anti-rotator is a hydraulic brake.

16. The transmission of claim 12, further comprising:
    a second anti-rotator for restricting rotation of the sun gear, wherein
    the second anti-rotator is an electronic brake.

* * * * *

UNITED STATES PATENT AND TRADEMARK OFFICE
CERTIFICATE OF CORRECTION

PATENT NO. : 9,744,839 B2  
APPLICATION NO. : 14/662081  
DATED : August 29, 2017  
INVENTOR(S) : Baek Yu Kim et al.

Page 1 of 1

It is certified that error appears in the above-identified patent and that said Letters Patent is hereby corrected as shown below:

On the Title Page

Item (73) Assignee:
"Hyundia Motor Company"

Should read:
--Hyundai Motor Company--

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*